United States Patent [19]

Lauder

[11] 4,110,254

[45] Aug. 29, 1978

[54] METAL OXIDE CATALYTIC COMPOSITIONS

[75] Inventor: Alan Lauder, Newark, Del.

[73] Assignee: E. I. Du Pont de Nemours & Company, Wilmington, Del.

[21] Appl. No.: 692,500

[22] Filed: Jun. 3, 1976

Related U.S. Application Data

[63] Continuation-in-part of Ser. No. 463,985, Apr. 25, 1974, abandoned.

[51] Int. Cl.$^2$ .................. B01J 21/04; B01J 23/10; B01J 23/58; B01J 23/64
[52] U.S. Cl. .................................... 252/462; 252/464; 252/465; 252/466 B; 252/466 PT; 252/471; 252/472; 252/473; 252/474; 423/213.5
[58] Field of Search ............ 252/462, 466 PT, 466 B, 252/472, 473, 474, 471, 465; 423/213.2, 213.5, 593

[56] References Cited

U.S. PATENT DOCUMENTS

| | | | |
|---|---|---|---|
| 3,900,428 | 8/1975 | Mai et al. | 252/462 |
| 3,901,828 | 8/1975 | Mai et al. | 252/462 |
| 3,907,968 | 9/1975 | Kobylinski et al. | 423/213.5 |

*Primary Examiner*—W. J. Shine

[57] ABSTRACT

Catalytic compounds having the general formula $ABO_3$ and a perovskite crystal structure, wherein about from 1 to 20% of the B site cations are ions of a platinum metal, the remainder of the B site cations are ions of metals having atomic radii between about from 0.4 and 1.4 Angstroms, and the A site cations consist essentially of ions of a metal having an atomic number of 11 to 51, 57 to 71, or 89 to 103, useful for the promotion of gaseous oxidation and reduction reactions, particularly in the cleanup of exhaust gases of internal combustion engines.

17 Claims, No Drawings

METAL OXIDE CATALYTIC COMPOSITIONS

CROSS-REFERENCE TO RELATED APPLICATIONS

This is a continuation-in-part of copending application Ser. No. 463,985, filed Apr. 25, 1974, now abandoned.

BACKGROUND OF THE INVENTION

Considerable effort has been expended in recent years in the development of improved heterogeneous catalysts for chemical reactions, particularly for the partial or complete oxidation of volatile carbon compounds in air and for the reduction of nitrogen oxides to nitrogen by hydrogen, carbon monoxide, and other carbon compounds. Such efforts have been directed not only toward the development of more effective catalysts for use in the manufacture of organic chemicals and for the reduction of atmospheric pollution by industrial processes involving the manufacture and use of nitric acid, but have also been directed toward the reduction of atmospheric pollution by exhaust gases from internal combustion engines.

Among the catalytic compositions which have been proposed for reducing the concentration of nitrogen oxides in off gases for nitric acid plants and exhaust gases of internal combustion engines are such platinum metals as platinum, palladium, rhodium, ad ruthenium and the oxides of such metals of the first transition series of the periodic table as iron, cobalt, and nickel and of such rare earth metals as lanthanum, neodymium and praseodymium.

Many materials have been suggested as catalysts for the oxidation of carbon monoxide, hydrocarbons and partial oxidation of products of hydrocarbons in the exhaust gases of internal combustion engines, including the oxides, cerates, chromates, chromites, manganates, manganites, molybdates, tungstates, carbonates, stannates, ferrites, and vanadates of such metals as iron, cobalt, nickel, zinc, palladium, platinum, ruthenium, rhodium, manganese, chromium, copper, cadmium, silver, calcium, barium, mercury, tin, lead, molybdenum, tungsten, and the rare earths and mixtures of these compounds and such precious metals as ruthenium, rhodium, palladium and platinum.

Also among the catalysts proposed for the reduction of nitrogen oxide, the oxidation of carbon monoxide and hydrocarbons, ad other reactions involved in the purification of automotive exhaust gases are a group of metal oxides of the perovskite crystal type. For example, lanthanum cobaltite, neodymium cobaltite, dysprosium cobaltite, and a similar cobaltite containing a mixture of ions of rare earth metals have been shown to be effective heterogeneous catalysts for the hydrogenation and hydrogenolysis of cis-2-butene and these materials and similar perovskite metal oxides doped with metal ions having other valences (e.g., $Sr_{0.2}La_{0.8}CoO_3$) have been considered for use as automotive exhaust oxidation catalysts.

While the rare earth cobaltites and other perovskite compositions have advantages over the earlier catalytic materials, there is still a need for catalytic compositions which optimize catalytic performance. It is reported that the catalytic activity of the platinum metals in oxidation processes is greatly reduced by a long-time exposure to high temperatures, apparently because of changes in particle size and crystal structure or because of the formation of volatile oxides. Other proposed catalysts are effective only at high temperatures that require catalyst supports and enclosures made of materials which are scarce and difficult to fabricate. It has also been reported that some of the proposed catalysts for the reduction of nitrogen oxides, such as platinum and palladium catalysts, promote the formation of undesirably large amounts of ammonia instead of nitrogen from nitrogen oxides when the reducing agent is hydrogen. Similarly, some catalysts promote the formation of undesirably large amounts of intermediate oxidation products in the oxidation of hydrocarbons instead of promoting complete oxidation to carbon dioxide and water. Other catalysts, including the platinum metals and some of the transition and rare earth metal oxides, are reported to lose their catalytic activity upon exposure to alternately oxidizing and reducing environments such as can be produced by industrial processes and internal combustion engines operating under frequently changing conditions. Still other proposed catalysts have reduced catalytic activity after exposure to normally nonreactive components of gas mixtures. For example, the transition and rare earth metal oxides are reported to have reduced activity as catalysts for the oxidation of carbon monoxide and hydrocarbons in the presence of water and the platinum metal catalysts lose their catalytic activity upon exposure to internal combustion engine exhaust gases containing compounds of lead, sulfur, phosphorus, chlorine and other materials derived from additives conventionally employed in automotive fuels and lubricants.

Thus there is a need for catalysts which are low in cost, selective in promoting desired oxidation and/or reduction reactions at relatively low temperatures, active for long periods at the temperatures involved and in the presence of the materials incidental to these reactions, simple to prepare in suitable forms having high catalytic activity, and active at relatively low surface areas per unit weight of catalytic material.

SUMMARY OF THE INVENTION

The present invention comprises catalytic compounds having the perovskite-type $ABO_3$ crystal structure wherein the Type A cation sites are substantially fully occupied by ions of one metal having an atomic number of 11 to 51, 57 to 71, or 89 to 103; about from 1 to 20% of the Type B cation sites are occupied by ions of at least one platinum group metal selected from ruthenium, osmium, rhodium, iridium, palladium, and platinum; and the remainder of the Type B cation sites are occupied by ions of at least one non-platinum group metal having an ionic radius between 0.4 and 1.4 Angstroms.

These metal oxide compounds are especially useful as catalysts for the oxidation of carbon monoxide and gaseous hydrocarbons and for the reduction of nitrogen oxides under conditions typical of those involved in the cleanup of the exhaust gases from internal combustion engines.

DETAILED DESCRIPTION OF THE INVENTION

The catalytic compounds of this invention are metal oxides of the general empirical formula $ABO_3$ and having a perovskite crystal structure, containing substantially equal numbers of cations of two types of metals, occupying the Type A cation sites and the Type B cation sites in which there is substantially only one metal in the A cation sites and there are at least two different metals in the B cation sites. When in the ideal perovskite structure, such oxides contain cations of appropriate relative sizes and coordination properties and have cubic crystalline forms in which the corners of the unit cubes are occupied by the larger A site cations (each coordinated with twelve oxygen atoms), the centers of the cubes are occupied by the smaller B site cations (each coordinated with six oxygen atoms), and the faces of the cubes are occupied by oxygen atoms. Many variations and distortions of this fundamental cubic crystal structure are known among materials commonly considered to be perovskites or perovskite-like. Among the terms which have been used to describe variations of the cubic crystal structure of perovskite and perovskite-like metal oxides are rhombohedral, orthorhombic, pseudocubic, tetragonal, and pseudotetragonal.

In addition to the requirement that the total number of A site cations should equal the total number of B site cations, it is also required that the combined charge of the cations substantially equal the charge on the oxygen atoms.

The particular nonplatinum B site metals present in the metal oxide compounds of this invention along with any particular A site metal depend to some degree upon the radii of the metal cations. The importance of ionic radii in perovskite crystal structures has been discussed by many authors, e.g., by Krebs in "Fundamentals of Inorganic Crystal Chemistry," McGraw Hill, London (1968). Assuming that the crystal structure is formed by the packing of spherical ions, there can be derived the relationship $$R_A + R_0 = t\sqrt{2}(R_B + R_0)$$

in which $R_A$, $R_B$, and $R_0$ are the ionic radii of the A site metal, the B site metal, and the oxygen ions, respectively, and $t$ is a tolerance factor. Tetragonal perovskite crystal structures are usually obtained in simple ternary compounds when $t$ is between about 0.9 and 1.0. Distorted perovskite-type structures usually result when $t$ is between about 0.8 and 0.9. Perovskite-type structures can be obtained with wider departures from this idealized picture picture in the more complex compounds of the present invention, particularly when these compounds contain small proportions of ions having radii larger or smaller than would be accommodated with the tolerance factor $t$ between 0.8 and 1.0. Ionic radii have been tabulated by Shannon and Prewitt Acta. Cryst. B26 1046 (1970); B25 925 (1969).

The compounds of this invention contain the ions of a metal in the A site having an atomic number 11 to 51, 57 to 71, and 89 to 103. The A site metal ion in the present compounds can have valence of one, two or three in which the particular metal can exist in a perovskite crystal structure in combination with appropriate metal ions in the B site. Preferably a metal in valence one is cesium, rubidium, potassium, sodium, or silver and more preferably it is potassium or sodium. Similarly, an A site metal having valence two is strontium or calcium. Likewise an A site metal having valence three preferably is lanthanum.

About from 1 to 20% of the B site cations of the present compounds are ions of at least one platinum metal. Ruthenium, osmium, rhodium, and iridium are capable of occupying all of the Type B cation sites in perovskite crystal structures, but little additional catalytic benefit is achieved when more than about 20% of the sites are occupied by these metals. Little catalytic benefit is realized by the inclusion of less than about 1% of the platinum metal ion. Palladium and platinum ions are larger than ruthenium, osmium, rhodium, and iridium ions and generally not more than about 10% of the Type B sites of crystalline oxides of the $ABO_3$ type can be occupied by the ions of these metals with retention of a perovskite structure. Palladium is typically divalent, rhodium is typically trivalent, ruthenium, iridium, and platinum are typically tetravalent, and osmium can have a valence of four, five, six, or seven in these compounds. Mixtures of the platinum metals obtained by the partial refining of the partial refining of their ores are useful in these compounds.

The metal oxides of this invention containing ruthenium are particularly useful as catalysts for the reduction of nitrogen oxides. They generally catalyze the reduction of these oxides to innocuous compounds (e.g., nitrogen) instead of to ammonia. Such oxides containing ruthenium are, in general, more stable than similar compounds containing osmium, possibly because of the lower volatility of ruthenium oxides, and are also preferred because of the generally greater toxicity of osmium compounds. Metal oxides containing platinum and palladium are particularly useful as catalysts for the complete oxidation of carbon compounds to carbon dioxide.

The nonplatinum metals which constitute about from 80 to 99% of the B site metals in the present compounds can each be present in any amounts and have any valences which are consistent with the perovskite crystal structure of the compounds. Thus they can have valences one to seven and can be from the periodic table groups 1A, 1B, 2A, 2B, 3A, 3B, 4A, 4B, 5A, 5B, 6B, 7B, and 8 or from the lanthanide and actinide rare earth metals.

Thus the nonplatinum metals for the B site having valence one can be from groups 1A and 1B. Preferably they are sodium, silver, or copper. The nonplatinum B site metals having valence two can be from groups 1B, 2A, 2B, 3B, 6B, 7B, and 8. Preferably they are magnesium, calcium, strontium, chromium, manganese, iron, cobalt, nickel, or copper. The nonplatinum B site metals having valence three can be from groups 3A, 3B, 4B, 5A, 5B, 6B, 7B, and 8 and the lanthanide and actinide rare earth metals. Preferably they are lanthanum, a lanthanide rare earth metal, aluminum, titanium, vanadium, chromium, manganese, iron, cobalt, or nickel. The nonplatinum B site metals having valence four can be from groups 4A, 4B, 5B, 6B 7B and 8. Preferably they are titanium, vanadium, chromium, manganese, iron, cobalt, nickel, or rhenium. The nonplatinum B site metals having valence five can be from groups 5A, 5B, 6B and 7B. Preferably they are selected from antimony, niobium, tantalum, vanadium and rhenium. The nonplatinum B site metals having valence six and seven are preferably tungsten, molybdenum, or rhenium.

The nonplatinum B site metals indicated to be preferred in the various valences one to seven are preferred because of one or more of the following reasons:

(1) their ionic size, with correspondingly increased ease of formation and greater stability of perovskite crystal structures;

(2) their capability of existing in perovskit crystal structures in which they are in more than one valence;

(3) their generally high catalytic activity and/or selectivity in metal oxide compounds;

(4) their greater abundance and corresponding generally lower cost; or (5) their stability in perovskite crystal structures.

Certain compounds of this invention contain nonplatinum B site metals having a single fixed valence. Such compounds have a major proportion (e.g., at least about 50% and preferably 75% or more) of nonplatinum B site metals which are known in perovskite crystal structures primarily or only in one valence. The metals of this group are:

valence 1: lithium, sodium, silver;
valence 2: magnesium, calcium, strontium, barium, zinc, cadmium;
valence 3: aluminum, gallium, indium, thallium, lanthanum, yttrium, and neodymium;
valence 4: zirconium, hafnium, thorium, germanium, tin;
valence 5: antimony, tantalum;
valence 6: tungsten.

Preferably the nonplatinum metals of this class are sodium, magnesium, calcium, strontium, aluminum, tin, or antimony. These relatively abundant metals can be present in the compounds of this embodiment in major proportions with relatively small reductions in the catalytic activity contributed to these compounds by other less readily available metals and therefore represent relatively inexpensive diluents in such compounds. More preferably, the compounds contain a valence three metal and especially aluminum as the principal nonplatinum metal. Aluminum is not only an inexpensive diluent but also imparts to perovskite crystal structures a high degree of thermal stability and durability in catalytic applications.

Another embodiment of this invention comprises compounds wherein a major proportion (e.g., at least 50% and preferably more than 75%) of the nonplatinum B site metals exhibit a variable valence, that is, are known in a first valence in one perovskite compound and in a second valence in a second perovskite compound. Such metals known in perovskite crystal structures in two valences differing in increments of one or two valence units are:

valences 1 and 2: copper;
valences 2 and 3: scandium, samarium, ytterbium;
valences 2 and 4: lead;
valences 2, 3, and 4: chromium, manganese, iron, cobalt, nickel, and cerium;
valences 3 and 4: titanium, praseodymium;
valences 3, 4, and 5: vanadium;
valences 3 and 5: bismuth, niobium;
valences 4 and 6: molybdenum;
valences 4, 5 and 6: rhenium and uranium.

The compounds of this embodiment can contain one and preferably contain two or more such variable-valence nonplatinum metals, particularly those transition metals which have atomic numbers between 22 and 29 inclusive, that is, titanium, vanadium, chromium, manganese, iron, cobalt, nickel, and copper. Particularly preferred are iron, cobalt, and nickel. These metals are readily available and compounds containing them are capable of existing in perovskite crystal structures in two or three valences differing by one valence unit increments. In one preferred embodiment of this invention the nonplatinum Type B metals are such metals each in a single valence.

Those compounds in which at least one nonplatinum B site metal is present in two valences constitute another preferred embodiment of this invention. Such metal oxides have increased activity as catalysts over similar compounds in which each of the component metals is present in only a single valence, possibly because of the enhanced electron mobility through their crystal structures resulting from the presence of a variable-valence metal when at least 5% of the nonplatinum B sites are occupied by a variable-valence metal in a first valence and at least 5% of the nonplatinum B sites are occupied by the same metal in a second valence. The valences preferably differ by one unit but will differ by two units with some metals, such as lead and niobium.

The present compounds which contain a single A site metal and at least one metal ion in the B site which can be in perovskite crystal structures in two or more valences permits easy adjustment of the valence balance of the compound. The amounts of differing valence forms of a compound can be adjusted so that the total valence charge of the metals equals the total valence charge of the oxygen present. Examples of such balanced compounds include $[La(III)][Ti(IV)_{0.2}Cr(II)_{0.1}Cr(III)_{0.6}Pd(II)_{0.1}]O_3$
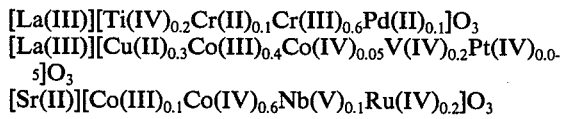
$[Sr(II)][Co(III)_{0.1}Co(IV)_{0.6}Nb(V)_{0.1}Ru(IV)_{0.2}]O_3$ Similarly, variable valance metals permit the formation of the perovskite crystal structure when deficiencies of up to about 25% of a metal or oxygen might prevent the precise $ABO_3$ stoichiometric ratio.

The compounds of this invention can be prepared by heating mixtures of metal oxides, hydroxides, metals, and/or metal salts for sufficient times at tempratures which permit spontaneous formation of the compounds. The mixture of materials which are heated are preferably finely subdivided and intimately mixed before heating and are thoroughly ground and mixed by any conventional techniques several times during the heating period, since the compounds are in many instances formed by atomic diffusion, without melting of any of the starting or potential intermediate materials, and are subject to coating of unreacted particles by reaction products. The heating times and temperatures required for the formation of significant amounts of these catalytic compounds depend upon the particular compositions being formed, the required times usually being shorter at higher temperatures. Temperatures above about 900° C. are usually suitable for the formation of these compounds, using firing times of hours to days with occasional intermediate grinding and mixing, but temperatures of from 1000° to 1500° C. can also be used.

In forming the compounds of this invention, stoichiometric mixtures of starting materials are preferably heated in air or other oxygen-containing gas mixture.

The starting materials used in preparing the compounds of this invention by anhydrous processes can be any salts which are converted to oxides by prolonged heating in oxidizing atmospheres at the temperatures at which these compositions are formed. For example, they can be carbonates, salts of carboxylic acids such as acetates, oxalates and tartrates; salts of the acids of sulfur such as sulfides, sulfites and sulfates; halogen acid salts which are converted to oxides without volatilization such as ruthenium chloride, strontium chlorate and barium perchlorate; and salts of the acids of nitrogen such as nitrates and nitrites. Preferably they are carbonates, nitrates or sulfates. The presence of small amounts of the salts of other such acids in a mixture which is predominately oxides or carbonates is usually not significantly deleterious since such salts are converted into oxides during heating to prepare these catalytic compositions.

The compounds of this invention are presumed to function as catalysts primarly at their surfaces, so compositions with significant surface areas are preferred. The surface areas of compounds prepared by heating mixtures of materials can be increased by grinding and other conventional methods. Catalytically active compounds with surface areas between about 0.1 and 10 square meters per gram (determined by the well-known Brunauer-Emmett-Teller method) can be obtained. Compounds with surface areas greater than about one square meter per gram are preferred. The surface area of these compounds remains relatively unchanged during use by virtue of their compositional and structural stability at high temperatures.

The compounds described herein can be used as catalysts in the form of free-flowing powders, for instance in fluid-bed reaction systems, or in the form of shaped structures providing efficient contact between the catalyst and the reactant gases. Such catalyst structures can contain minor (e.g., less than about 50%) or major (e.g., more than about 50 to about 98%) amounts of catalytically inert materials. These inert materials can be either porous or solid, with the catalytic compounds primarily on the surfaces thereof or more or less uniformly dispersed throughout. For example, the powdered compounds can be formed into porous catalyst pellets in which they are dispersed throughout by conventional techniques employing pellet presses, rolling mixers, extruders, etc. Preferably such pellets contain suitable dispersants, lubricants, and/or binders.

One particularly useful dispersant-binder for use in forming extruded pellet catalyst structures containing the catalyst compositions described herein is a high-purity alpha alumina monohydrate sold by the Continental Oil Co. as "Dispal." This material is a white, free-flowing powder of small particle size formed of very fine ultimate crystallites having a surface area of about 200 square meters per gram and a bulk density of 45 to 50 pounds per cubic foot. It forms thixotropic dispersions at concentrations of about 3 to 30% in water containing about 4 to 6% commercial concentrated (37% HCl) hydrochloric acid based on the weight of alumina, which dispersions become thicker upon standing. Thick dispersions containing about 20 to 30 parts of the alumina monohydrate and about 100 to 150 parts of acidified water per 100 parts of a catalytic composition having a surface area of about two square meters per gram can be extruded through small orifices to obtain structures which retain their form when wet and have significant strength when dried of gross water and heated at about 500° C. to about 900° C. to remove at least a part of the water present in the alumina monohydrate.

The compounds of this invention are preferably employed as catlysts in the form of coatings on suitable refractory supports. Such supports can be in any convenient shape, including powders, granules, spheres, rings, tablets, pills, bars, tubes, extruded shapes, rolls, spirals, screens, beads, coils, and the more elaborate shapes (e.g., corrugated and flat sheets, honeycombs, etc.) prepared by a variety of methods and recently available to the art.

Suitable supports can be composed solely or primarily of silica, of ceramic compositions having softening or melting temperatures above the temperatures involved in forming or coating these catalytic compositions on such supports, of natural silicious materials such as diatomaceous earths and pumice, as well as of alundum, gamma alumina, silicon carbide, titania, zirconia, and other such refractory materials.

A particularly useful refractory support is an alumina ceramic described in U.S. Pat. Nos. 3,255,027; 3,338,995, and 3,397,154. Such materials can be made by coating an aluminum foil fabricated into a shaped structure having the desired final configuration with a fluxing agent and firing to convert the aluminum into substantially pure alpha alumina. Suitable fluxing agents include alkali and alkaline earth metal oxides and compounds which yield such oxides on firing (e.g., sodium silicate) which serve to prevent inhibition of oxidation of the aluminum due to oxide scum formation on the surface of the aluminum. One such alumina contains, for example, small amounts of magnesium aluminate and aluminum silicate. As disclosed in the abovementioned patents, honeycomb structures can be made by placing fluxcoated corrugate sheets of aluminum together node-to-node and firing. Similar structures can be obtained by applying a composition containing aluminum powder, a binder, a fluxing agent, and a liquid carrier to a corrugated paper honeycomb structure and firing in an oxidizing atmosphere to burn out the paper structure and oxidize the aluminum to alumina. Honeycomb structures of such alumina compositions can be purchased from the Industrial Chemicals Department, E. I. du Pont de Nemours & Company, under the trade name "Torvex." The preferred structures have nominal cell sizes 1/16 to ¼ inch.

The compounds can be applied to suitble supports in several ways. For example, they can be formed upon supports which are sufficiently high melting and nonreactive by soaking the support structure in a solution of a suitable mixture of salts, drying, and firing the impregnated support to a temperature and for a time sufficient to form the catalytic structure. Alternately, the compounds can be preformed and applied to the support structure in a slurry which can optionally contain diluent materials which can also be catalytic materials. A particularly useful dispersant-binder for use in such slurry-coating processes is the "Dispal" alpha alumina monohydrate described hereinabove as a dispersant-binder useful in making extruded catalyst structures. Typically, acidified dispersions containing about 4 to 10% alpha alumina hydrate and a comparable amount of the ground catalytic composition are prepared, pieces of the support material are coated with the dispersion, the coated pieces are dried, and the dried coated pieces are heated to a temperature and for a time (e.g., for 2 to 24 hours at 500° to 900° C.) to remove at least a portion of the water from the alpha alumina monohydrate. Other support materials and techniques for applying catalytic materials to supports, useful and effective with the compounds of this invention, are described by Sowards and Stiles in U.S. Pat. No. 3,518,206 and by Aarons in U.S. Pat. No. 3,554,929.

The metal oxides of the present invention are stable and durable at high temperatures and have been shown to catalyze the oxidation of hydrocarbons and carbon monoxide and also the reaction between nitrogen oxide ($NO_x$) and carbon monoxide to give nitrogen and carbon dioxide. They are not poisoned by the lead compounds present in the exhaust of internal combustion engines operated on leaded gasoline. Accordingly, an important use of the catalysts of this invention is the removal of noxious components from the exhaust of internal combustion engines. For this purpose the catalysts are preferably supported on shaped alumina supports, although other supports inert to the exhaust gas at the operating temperature may be used.

As formed by heating and grinding, the compounds of the present invention are obtained in the form of a crystalline powder. Particularly effective and durable catalysts for use in treating the exhaust gases of internal combustion engines operating with leaded fuels are obtained when this powder is supported on an alumina support, preferably the honeycomb-structured alumina supports sold under the trade name "Torvex" described hereinabove. The catalyst powder should be applied to the surface, together with a binder to affix the same to the support, in an amount sufficient to coat the entire surface, usually in an amount of from 2 to 25% by weight of the support.

The catalytic compounds of the present invention may be employed to catalyze other reactions similar to the reactions occurring in the purification of internal combustion engine exhausts. For such applications, where lead compounds are absent, a wider variety of support materials may be employed such as pellets or other shaped structures of mullite, cordierite and silica.

This invention is further illustrated by the following specific examples.

EXAMPLES 1-6

In Examples 1-6, metal oxides were prepared having the following nominal compositions:

Example
1. $[La][Ti_{0.2}Cr_{0.7}Pd_{0.1}]O_3$
2. $[Nd][Cu_{0.25}Cr_{0.20}Co_{0.50}Ir_{0.05}]O_3$
3. $[K][Nb_{0.9}Pt_{0.1}]O_3$
4. $[Sr][Ti_{0.5}Mn_{0.4}Pt_{0.1}]O_3$
5. $[La][Cu_{0.30}V_{0.20}Co_{0.45}Pt_{0.05}]O_3$
6. $[Sr][Co_{0.7}Nb_{0.1}Ru_{0.2}]O_3$ The oxides were prepared by mixing the ingredients listed in Table I, grinding until homogeneous, and heating the mixtures in porcelain crucibles in air in a muffle furnace for the number of days and at the temperatures given in Table I with occasional regrinding and remixing. Each of the resulting compositions was finally ground and passed through a 325-mesh Tyler standard sieve screen. The X-ray diffraction patterns of these metal oxides were consistent with the expected perovskite structure, and showed substantially complete incorporation of the starting material into the crystal structure.

The pattern for the compound of Example 1 was similar to that of the perovskites $LaCoO_3$, $LaFeO_3$, $[Sr_{0.2}La_{0.8}][Co]O_3$ and $[Sr_{0.2}La_{0.8}][Cr_{0.9}Ru_{0.1}]O_3$ with slightly different d-spacings and no evidence of binary oxides.

The pattern for the compound of Example 2 was similar to that of the perovskite composition $[Sr_{0.2}La_{0.8}][Co_{0.9}Rh_{0.1}]O_3$, showing $LaCoO_3$-type crystal structure with larger d-spacings and loss of line resolution. A trace (less than 0.2%) of an unidentified component and no evidence of binary metal oxides were observed.

The pattern for the compound of Example 3 was very similar to that of the perovskite $KNbO_3$, (two crystal forms), possibly with a trace (less than 0.2%) of platinum in the metallic state. No evidence of binary metal oxides was found.

The pattern for the compound of Example 4 was similar to that of the perovskite $SrTiO_3$, with possible traces (less than 0.2%) of $Sr_3Ti_3O_{10}$ and of platinum in the metallic state. No evidence of binary metal oxides was found.

The pattern for the compound of Example 5 was similar to that of the perovskites $LaCoO_3$, $LaFeO_3$, $[Sr_{0.2}La_{0.8}][Co]O_3$, and $[Sr_{0.2}La_{0.8}][Cr_{0.9}Ru_{0.1}]O_3$, with slightly different d-spacings and no evidence of binary metal oxides.

The pattern for the compound of Example 6 was similar to that of the perovskite $LaCoO_3$ with shorter d-spacings, and traces (less than 0.2%) of $CoO$ and an unidentified component.

The catalytic compositions were applied to supports for testing of their performance characteristics. One part of "Dispal" M alumina dispersant and binder (obtained from the Continental Oil Co.) was mixed with 17 parts of water containing a few drops of commercial concentrated hydrochloric acid. To separate portions of such mixtures was added 7.5 parts of each of the catalytic compositions described above to obtain a stable thixotropic slurry. Cylinders of "Torvex" alumina ceramic honeycomb with straight-through cells (obtained from E. I. du Pont de Nemours & Co.) were soaked in water. These cylinders weighed about 6 grams, were about 2.5 centimeters in diameter and thickness and nominally had a cell size of 1/16 inch, wall thickness of 0.018 inch, open area of 50%, 253 hexagonal holes per square inch, and a nominal geometric surface area of 462 square feet per cubic foot. The watersoaked cylinders were dipped into the slurries of the catalytic compositions, the gross excess of slurry was removed by blowing the cylinders with air, the cylinders were dried, and the cylinders coated with the catalytic composition and binder were heated for about 30 minutes in a muffle furnace at 650°–900° C. The cooled supports were again dipped into the slurries, blown free of gross slurry, and dried and then heated for two hours or more in the muffle furnace at 650°–900° C. The percentage increases in weight of the supports due to the adherent catalytic compositions and binder are given in Table I.

TABLE I

| | Preparation of Compositions | | | | | |
|---|---|---|---|---|---|---|
| | Grams of Ingredients Employed | | | | | |
| Example | 1 | 2 | 3 | 4 | 5 | 6 |
| Ingredients | | | | | | |
| Potassium carbonate, $K_2CO_3$ | — | — | 11.50 | — | — | — |
| Strontium carbonate, $SrCO_3$ | — | — | — | 23.00 | — | 15.87 |

TABLE I-continued

| | Preparation of Compositions | | | | | |
|---|---|---|---|---|---|---|
| | Grams of Ingredients Employed | | | | | |
| Example | 1 | 2 | 3 | 4 | 5 | 6 |
| Lanthanum oxide, $La_2O_3$ | 17.10 | — | — | — | 20.00 | — |
| Neodynium oxide, $Nd_2O_3$ | — | 22.50 | — | — | — | — |
| Copper oxide, CuO | — | 2.66 | — | — | — | — |
| Titanium dioxide, $TiO_2$ | 1.68 | — | — | 6.24 | — | — |
| Vanadium pentoxide, $V_2O_5$ | — | — | — | — | 2.24 | — |
| Chromium trioxide, $Cr_2O_3$ | 5.59 | 2.03 | — | — | 6.56 | — |
| Manganese carbonate, $MnCO_3$ | — | — | — | 7.17 | — | — |
| Cobalt carbonate, $CoCO_3$ | — | 7.96 | — | — | — | 8.95 |
| Niobium pentoxide, $Nb_2O_5$ | — | — | 19.50 | — | — | 1.43 |
| Ruthenium oxide, $RuO_2 \cdot xH_2O$ (43.5% Ru) | — | — | — | — | — | 5.00 |
| Palladium oxide, PdO (76.22% Pd) | — | — | — | — | — | — |
| Iridium oxide, $IrO_2$ (anhydrous) | — | 1.50 | — | — | — | — |
| Platinum oxide, $PtO_2$ (81.09% Pt) | — | — | 4.00 | — | — | — |
| Platinum oxide, $PtO_2$ (83.19% Pt) | — | — | — | 3.66 | — | — |
| Platinum oxide, $PtO_2$ (83.37% Pt) | — | — | — | — | 1.14 | — |
| Days heated in furnace | 5 | 4 | .5 | 5 | 5 | 4 |
| Furnace temperature, °C | 950 | 950 | 950 | 950 | 950 | 1000 |
| Percent composition and binder on support | 17.1 | 15.8 | 20.3 | 21.9 | 24.9 | 20.6 |

The compositions were tested for catalytic activity in the reduction of nitric oxide by carbon monoxide.

The "Torvex" ceramic honeycomb cylinders coated with the catalytic compositions and binder were separately installed in a stainless steel chamber with a nominal internal diameter of 2.5 centimeters, height of 2.5 centimeters, and volume of 12.3 cubic centimeters. Nitrogen containing about 2000 parts per million of nitric oxide and about 10,000 parts per million of carbon monoxide was passed through the chamber at a nominal hourly space velocity of about 40,000 hr.$^{-1}$ and pressure of one pound per square inch gage while the feed gas and the catalyst chamber were heated in a programmed manner so that the temperature of the gas entering the catalyst chamber increased from about 60° to about 600° C. over about 90 minutes. Samples of the inlet and exit gases were obtained periodically. The nitric oxide in these samples was oxidized to nitrogen dioxide and the resulting gas mixture was analyzed by a modification of the colorimetric procedure described by B. E. Saltzman in "Analytical Chemistry," Volume 26, pages 1949–1955 (1954); and the percent reduction in the nitric oxide concentration of the gas upon passing through the catalyst chamber was calculated. A smooth plot was made of the degree of conversion of nitric oxide at different catalyst chamber inlet temperatures for each catalytic composition. From a smooth curve through each plot, temperatures were estimated for "light-off" (the intercept with the temperature axis of an extrapolation of the portion of the curve at which the degree of conversion changed rapidly with temperature) and for nitric oxide conversions of 25, 50, and 90%. The catalyst temperature was higher than the catalyst bed inlet temperature with all the catalytic composition at nitric oxide conversions greater than about 25%. Table II gives the estimated temperatures for "light-off" and for 25, 50, and 90% conversion of nitric oxide before and after heating the catalyst-coated honeycomb cylinders for 100 hours at about 900° C.

The catalytic activity of the above-described "Torvex" cylinders coated with catalytic compositions and binder in the oxidation of carbon monoxide was determined in a similar apparatus and by a similar procedure. Nitrogen containing about 10,000 parts per million of carbon monoxide and 10,000 parts per million of oxygen was passed through the catalyst chamber and the entering and exiting gas mixtures were analyzed chromatographically using a column containing granules of "Linde" 13X molecular sieve. The estimated temperatures for "light-off" and for 25, 50, and 90% conversion of carbon monoxide before and after heating the catalyst-coated honeycomb cylinders for 100 hours at about 900° C. are given in Table II.

The catalytic activity of the above-described "Torvex" cylinders coated with catalytic compositions and binder in the oxidation of propane was then determined in a similar apparatus and by a similar procedure. Nitrogen containing about 1,300 parts per million of propane and 880 parts per million of oxygen was passed through the catalyst chamber and the entering and exiting gases were analyzed chromatographically using a column containing 80 to 100 mesh "Poropak" Q. The estimated temperatures for "light-off" and for 25, 50, and 90% conversion of propane before and after heating the catalyst-coated honeycomb cylinders for 100 hours at about 900° C. are given in Table II.

TABLE II

| | Catalytic Activity of Compositions | | | | | | | | | | | |
|---|---|---|---|---|---|---|---|---|---|---|---|---|
| Example | 1 | | 2 | | 3 | | 4 | | 5 | | 6 | |
| Hours at 900° C: | 0 | 100 | 0 | 100 | 0 | 100 | 0 | 100 | 0 | 100 | 0 | 100 |
| Reduction of Nitric Oxide | | | | | | | | | | | | |
| "Light-off" temp., °C | 305 | 305 | 265 | 295 | 295 | 325 | 295 | 305 | 305 | 285 | 290 | 295 |
| 25% conversion, °C | 340 | 365 | 385 | 385 | 340 | 405 | 325 | 355 | 350 | 345 | 310 | 315 |
| 50% conversion, °C | 375 | 440 | 450 | 465 | 380 | 490 | 350 | 415 | 400 | 405 | 335 | 340 |
| 90% conversion, °C | 540 | — | 540 | 575 | 550 | — | 400 | 590 | 485 | 490 | 375 | 375 |
| Oxidation of Carbon Monoxide | | | | | | | | | | | | |
| "Light-off" temp., °C | 255 | 270 | 230 | 215 | 255 | 305 | 240 | 205 | 225 | 175 | 280 | 265 |
| 25% conversion, °C | 270 | 290 | 290 | 240 | 290 | 325 | 260 | 260 | 245 | 190 | 315 | 290 |
| 50% conversion, °C | 290 | 310 | 315 | 265 | 320 | 350 | 275 | 315 | 265 | 200 | 355 | 320 |
| 90% conversion, °C | 320 | 345 | 350 | 305 | 365 | 390 | 300 | 365 | 295 | 250 | 460 | 415 |
| Oxidation of Propane | | | | | | | | | | | | |
| "Light-off" temp., °C | 400 | 400 | 390 | 385 | 500 | 380 | 295 | 210 | 455 | 410 | 330 | 350 |
| 25% conversion, °C | 460 | 585 | 495 | — | 575 | — | 345 | 3350 | 480 | 495 | 530 | 500 |
| 50% conversion, °C | — | — | — | — | — | — | 515 | 540 | 515 | 560 | 590 | — |

TABLE II-continued

| Example | Catalytic Activity of Compositions | | | | | | | | | | | |
|---|---|---|---|---|---|---|---|---|---|---|---|---|
| | 1 | | 2 | | 3 | | 4 | | 5 | | 6 | |
| Hours at 900° C: | 0 | 100 | 0 | 100 | 0 | 100 | 0 | 100 | 0 | 100 | 0 | 100 |
| 90% conversion, ° C | — | — | — | — | — | — | — | — | — | — | — | — |

EXAMPLE 7

A metal oxide composition having the nominal formula [La][Fe$_{0.3}$Ni$_{0.6}$Rh$_{0.1}$]O$_3$ was prepared by dissolving 88.8 grams of lanthanum nitrate (La(NO$_3$)$_3$.5H$_2$O), 24.8 grams of ferric nitrate (Fe(NO$_3$)$_3$.6H$_2$O), 35.8 grams of nickel nitrate (Ni(NO$_3$)$_2$.6H$_2$O) and 5.00 grams of rhodium chloride (RhCl$_3$.2H$_2$O, containing 42.07% Rh) in water, adding slowly and with vigorous stirring a solution of 94.1 grams of potassium carbonate (K$_2$CO$_3$) in water to obtain a total volume of about two liters, separating the precipitated mixture of carbonates, drying at 120° C. under reduced pressure, grinding and mixing thoroughly and heating at 900° C. for four days with occasional grinding. The resulting black composition was ground and was passed through a 325-mesh screen sieve. The X-ray diffraction spectrum of this composition was similar to those of the perovskites LaNiO$_3$ and LaFeO$_3$ with shifts in the line spacings and no evidence of binary metal oxides.

The general procedure of Example 1 was used to apply the above described catalytic composition [La][Fe$_{0.3}$Ni$_{0.6}$Rh$_{0.1}$]O$_3$ to cylinders of "Torvex" alumina ceramix honeycomb. The dry coated cylinders weighed 17.4% more than the dry uncoated cylinders.

The catalytic activity of this composition in the reduction of nitric oxide by carbon monoxide, the oxidation of carbon monoxide, the oxidation of propane, determined by the procedures described in Example 1 before and after heating the composition on its supports for an additional 100 hours at about 900° C., is indicated by the data in Table III.

TABLE III

| | Catalytic Activity | |
|---|---|---|
| Hours at 900° C: | 0 | 100 |
| Reduction of Nitric Oxide | | |
| "Light-off" temp., ° C | 305 | 375 |
| 25% conversion temp., ° C | 345 | 420 |
| 50% conversion temp., ° C | 385 | 470 |
| 90% conversion temp., ° C | 500 | 580 |
| Oxidation of Carbon Monoxide | | |
| "Light-off" temp., ° C | 230 | 270 |
| 25% conversion temp., ° C | 255 | 280 |
| 50% conversion temp., ° C | 280 | 295 |
| 90% conversion temp., ° C | 320 | 320 |
| Oxidation of Propane | | |
| "Light-off" temp., ° C | 405 | 370 |
| 25% conversion temp., ° C | 440 | 440 |
| 50% conversion temp., ° C | 540 | 520 |
| 90% conversion temp., ° C | — | — |

I claim:

1. Catalytic compounds having the perovskite-type ABO$_3$ crystal structure wherein the Type A cation sites are substantially fully occupied by ions of one metal having an atomic number of 11 to 51, 57 to 71, or 89 to 103; about 1 to 20% of the Type B cation sites are occupied by ions of at least one platinum group metal selected from ruthenium, osmium, rhodium, iridium, palladium, and platinum and the remainder of the Type B cation sites are occupied by ions of at least one non-platinum group metal having an ionic radius between 0.4 and 1.4 Angstroms, and wherein a major portion of the nonplatinum group B site metals have a single fixed valence of three.

2. A catalytic compound of claim 1 wherein the fixed valence non-platinum group B site metal is aluminum.

3. A catalytic compound of claim 1 wherein the Type A cation sites are substantially fully occupied by ions having a valence of three.

4. Catalytic compounds having the perovskite-type ABO$_3$ crystal structure wherein the Type A cation sites are substantially fully occupied by ions of one metal having an atomic number of 11 to 51, 57 to 71, or 89 to 103; about from 1 to 20% of the Type B cation sites are occupied by ions of at least one platinum group metal selected from ruthenium, osmium, rhodium, iridium, palladium, and platinum; and the remainder of the Type B cation sites are occupied by ions of at least one now-platinum group metal having an ionic radius between 0.4 to 1.4 Angstroms and wherein at least 5% of the non-platinum group B sites are occupied by a metal present in a first valence and at least 5% of the non-platinum group B sites are occupied by the same metal in a second valence.

5. Catalytic compounds having the perovskite-type ABO$_3$ crystal structure wherein the Type A cation sites are substantially fully occupied by ions of one metal having an atomic number of 11 to 51, 57 to 71, or 89 to 103; about from 1 to 20% of the Type B cation sites are occupied by ions of at least one platinum group metal selected from osmium, rhodium, iridium, palladium, and platinum; and the remainder of the Type B cation sites are occupied by ions of at least one nonplatinum group metal having an ionic radius between 0.4 to 1.4 Angstroms.

6. A catalytic compound of claim 5 wherein the platinum group metal consists essentially of platinum.

7. A catalytic compound of claim 5 of the formula [La][Ti$_{0.2}$Cr$_{0.7}$Pd$_{0.1}$]O$_3$.

8. A catalytic compound of claim 5 of the formula [Nd][Cu$_{0.25}$Cr$_{0.20}$Co$_{0.50}$Ir$_{0.05}$]O$_3$.

9. A catalytic compound of claim 5 of the formula [K][Nb$_{0.9}$Pt$_{0.1}$]O$_3$.

10. A catalytic compound of claim 5 of the formula [Sr][Ti$_{0.5}$Mn$_{0.4}$Pt$_{0.1}$]O$_3$.

11. A catalytic compound of claim 5 of the formula [La][Cu$_{0.30}$V$_{0.20}$Co$_{0.45}$Pt$_{0.05}$]O$_3$.

12. A catalytic compound of claim 5 wherein a major portion of the nonplatinum group B site metals have single fixed valence.

13. A catalytic compound of claim 12 wherein the single fixed valence is three.

14. A catalytic compound of claim 13 wherein the fixed valence nonplatinum group B site metal is aluminum.

15. A catalytic compound of claim 5 wherein a major portion of the nonplatinum group B site metals have a variable valence.

16. A catalytic compound of claim 15 wherein the variable valence metals are selected from transition metals having atomic numbers between 22 and 29.

17. A catalytic compound of claim 15 wherein at least 5% of the nonplatinum group B sites are occupied by a metal present in a first valence and at least 5% of the nonplatinum group B sites are occupied by the same metal in a second valence.

* * * * *